United States Patent
Palkar et al.

(10) Patent No.: US 10,263,916 B2
(45) Date of Patent: Apr. 16, 2019

(54) SYSTEM AND METHOD FOR MESSAGE HANDLING IN A NETWORK DEVICE

(71) Applicant: Aruba Networks, Inc., Sunnyvale, CA (US)

(72) Inventors: Prasad Palkar, Sunnyvale, CA (US); Ramsundar Janakiraman, Sunnyvale, CA (US); Venkatesan Marichetty, Danville, CA (US); Andrew Schweig, San Francisco, CA (US); Shankar Subramaniam, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 382 days.

(21) Appl. No.: 13/918,732

(22) Filed: Jun. 14, 2013

(65) Prior Publication Data

US 2014/0156765 A1    Jun. 5, 2014

Related U.S. Application Data

(60) Provisional application No. 61/732,829, filed on Dec. 3, 2012.

(51) Int. Cl.
   *H04L 12/935*    (2013.01)
   *H04L 12/803*    (2013.01)
   (Continued)

(52) U.S. Cl.
   CPC ........ *H04L 49/3009* (2013.01); *H04L 45/566* (2013.01); *H04L 47/122* (2013.01);
   (Continued)

(58) Field of Classification Search
   CPC ....... H04L 41/00; H04L 41/02; H04L 41/022; H04L 41/0226; H04L 41/085;
   (Continued)

(56) References Cited

U.S. PATENT DOCUMENTS

| 5,400,325 | A | * | 3/1995 | Chatwani et al. | ............ 370/399 |
| 5,920,566 | A | * | 7/1999 | Hendel | ................... H04L 12/18 |
| | | | | | 370/356 |

(Continued)

FOREIGN PATENT DOCUMENTS

WO    2011/019372 A2    2/2011

OTHER PUBLICATIONS

Unknown (Understanding the ISO 7-Layer Model, Jun. 22, 2008, Technology Training Limited).*

(Continued)

*Primary Examiner* — Tauqir Hussain
*Assistant Examiner* — Boris D Grijalva Lobos
(74) *Attorney, Agent, or Firm* — Hewlett Packard Enterprise Patent Department

(57) ABSTRACT

The present disclosure discloses a method and system for achieving enhanced performance for application message handling. The disclosed system includes a device and is configured to receive, at a first processing layer implemented by the device, a message addressed to a first port. The system is further configured to modify the message to be addressed to a second port indicated in a body of the message prior to forwarding the message to a second processing layer implemented by the device. Furthermore, the system is configured to forward, by the first processing layer to the second processing layer, the modified message addressed to the second port.

17 Claims, 5 Drawing Sheets

(51) Int. Cl.
*H04L 29/06* (2006.01)
*H04L 12/721* (2013.01)
*H04L 12/801* (2013.01)
*H04L 29/12* (2006.01)
*H04L 12/841* (2013.01)

(52) U.S. Cl.
CPC .............. *H04L 47/19* (2013.01); *H04L 61/25* (2013.01); *H04L 47/28* (2013.01); *H04L 63/0272* (2013.01); *H04L 63/101* (2013.01)

(58) Field of Classification Search
CPC ......... H04L 41/12; H04L 45/00; H04L 45/74; H04L 45/741; H04L 47/00; H04L 47/19; H04L 47/193; H04L 47/196; H04L 47/20; H04L 47/70; H04L 49/00; H04L 49/25; H04L 49/30; H04L 49/3009; H04L 49/309; H04L 61/00; H04L 61/20; H04L 61/25; H04L 61/2503; H04L 61/2517
USPC ......................................................... 709/238
See application file for complete search history.

(56) References Cited

U.S. PATENT DOCUMENTS

| | | | |
|---|---|---|---|
| 6,098,172 A * | 8/2000 | Coss et al. ....................... 726/11 | |
| 6,101,189 A * | 8/2000 | Tsuruoka ............ H04L 12/2856 370/392 | |
| 6,118,760 A | 9/2000 | Zaumen et al. | |
| 6,118,765 A | 9/2000 | Phillips | |
| 6,158,008 A | 12/2000 | Maria et al. | |
| 6,167,045 A | 12/2000 | Pirovano et al. | |
| 6,167,450 A * | 12/2000 | Angwin ................... H04L 29/06 370/236 | |
| 6,195,688 B1 | 2/2001 | Caldwell et al. | |
| 6,212,195 B1 | 4/2001 | McCormack et al. | |
| 6,535,511 B1 * | 3/2003 | Rao ............... 370/392 | |
| 6,606,316 B1 * | 8/2003 | Albert .................. H04L 41/046 370/389 | |
| 6,651,096 B1 | 11/2003 | Gai et al. | |
| 6,728,265 B1 | 4/2004 | Yavatkar et al. | |
| 6,968,389 B1 * | 11/2005 | Menditto .......... H04L 29/12066 709/219 | |
| 7,006,436 B1 * | 2/2006 | Chu ................. H04L 29/06027 370/230 | |
| 7,505,434 B1 | 3/2009 | Backes | |
| 7,583,657 B1 * | 9/2009 | Webster et al. ............... 370/352 | |
| 7,624,263 B1 | 11/2009 | Viswanath et al. | |
| 7,626,934 B2 | 12/2009 | Oouchi et al. | |
| 7,913,294 B1 | 3/2011 | Maufer et al. | |
| 7,971,621 B2 | 7/2011 | Rogalla et al. | |
| 8,055,286 B1 * | 11/2011 | Reeves et al. ................ 455/466 | |
| 8,544,080 B2 * | 9/2013 | Arauz Rosado ............... 726/15 | |
| 8,767,730 B2 | 7/2014 | Ashwood-Smith | |
| 9,021,134 B1 * | 4/2015 | Patel ............... 709/246 | |
| 2002/0042875 A1 * | 4/2002 | Shukla ............. H04L 29/12009 713/151 | |
| 2002/0046271 A1 | 4/2002 | Huang | |
| 2003/0021288 A1 | 1/2003 | Hayashi et al. | |
| 2003/0037042 A1 | 2/2003 | Kametani | |
| 2003/0053448 A1 * | 3/2003 | Craig et al. ................... 370/353 | |
| 2003/0123462 A1 | 7/2003 | Kusayanagi | |
| 2003/0165121 A1 * | 9/2003 | Leung ............... H04L 29/12009 370/313 | |
| 2003/0229665 A1 | 12/2003 | Ryman | |
| 2003/0231596 A1 | 12/2003 | Hong | |
| 2004/0059942 A1 * | 3/2004 | Xie .............. 713/201 | |
| 2004/0093415 A1 | 5/2004 | Thomas | |
| 2004/0125812 A1 * | 7/2004 | Kao et al. ..................... 370/401 | |
| 2004/0151117 A1 | 8/2004 | Charcranoon | |
| 2004/0170181 A1 | 9/2004 | Bogdon et al. | |
| 2004/0189650 A1 | 9/2004 | Deering | |
| 2004/0190549 A1 * | 9/2004 | Huitema ........... H04L 29/12358 370/466 | |
| 2004/0205332 A1 | 10/2004 | Bouchard et al. | |
| 2004/0213237 A1 | 10/2004 | Yasue et al. | |
| 2005/0053054 A1 | 3/2005 | Das et al. | |
| 2005/0105524 A1 | 5/2005 | Stevens et al. | |
| 2005/0135359 A1 * | 6/2005 | Chang ............... H04L 29/12009 370/389 | |
| 2005/0193429 A1 | 9/2005 | Demopoulos et al. | |
| 2005/0198299 A1 | 9/2005 | Beck et al. | |
| 2005/0201391 A1 * | 9/2005 | Ma ................... H04L 29/12367 370/401 | |
| 2006/0047769 A1 | 3/2006 | Davis et al. | |
| 2006/0227770 A1 * | 10/2006 | Jakubik ............. H04L 29/12009 370/389 | |
| 2006/0256771 A1 * | 11/2006 | Yarlagadda ....... H04L 29/06027 370/352 | |
| 2006/0259608 A1 * | 11/2006 | Kim et al. .................... 709/223 | |
| 2006/0294588 A1 | 12/2006 | Lahann et al. | |
| 2007/0097875 A1 | 5/2007 | Bender et al. | |
| 2007/0100967 A1 | 5/2007 | Smith et al. | |
| 2007/0211714 A1 * | 9/2007 | Metke et al. ................. 370/389 | |
| 2007/0214265 A1 | 9/2007 | Zampiello et al. | |
| 2008/0095167 A1 | 4/2008 | Bruss | |
| 2008/0141332 A1 | 6/2008 | Treinen | |
| 2009/0149189 A1 | 6/2009 | Sammour et al. | |
| 2009/0150374 A1 | 6/2009 | Dewey et al. | |
| 2010/0037311 A1 | 2/2010 | He et al. | |
| 2010/0095359 A1 | 4/2010 | Gordon | |
| 2010/0172356 A1 | 7/2010 | Tavares et al. | |
| 2010/0235513 A1 | 9/2010 | Baffier et al. | |
| 2010/0241831 A1 | 9/2010 | Mahadevan et al. | |
| 2010/0263022 A1 | 10/2010 | Wynn et al. | |
| 2010/0329274 A1 | 12/2010 | Romero et al. | |
| 2011/0023088 A1 | 1/2011 | Ko et al. | |
| 2011/0138074 A1 | 6/2011 | Onda et al. | |
| 2011/0153862 A1 | 6/2011 | Roosta et al. | |
| 2011/0199898 A1 | 8/2011 | Cho et al. | |
| 2011/0258444 A1 | 10/2011 | Chayat | |
| 2011/0292933 A1 | 12/2011 | Rodriguez Perez et al. | |
| 2011/0292945 A1 | 12/2011 | Yasuda | |
| 2011/0314149 A1 | 12/2011 | Manning et al. | |
| 2012/0027008 A1 * | 2/2012 | Chou ................... H04L 45/00 370/352 | |
| 2012/0057599 A1 | 3/2012 | Yong | |
| 2012/0092996 A1 | 4/2012 | Lautenschlaeger | |
| 2012/0207164 A1 | 8/2012 | Tanaka | |
| 2012/0281530 A1 | 11/2012 | Sambhwani et al. | |
| 2013/0042301 A1 | 2/2013 | Mahamuni et al. | |
| 2013/0246619 A1 | 9/2013 | Raja et al. | |
| 2013/0262651 A1 | 10/2013 | Shah et al. | |
| 2013/0286846 A1 | 10/2013 | Atlas et al. | |
| 2013/0322444 A1 | 12/2013 | Ossipov | |
| 2014/0274082 A1 | 9/2014 | Huang et al. | |

OTHER PUBLICATIONS

"Self-Contained", The Free Dictionary, 2011.*
Non-Final Office Action in U.S. Appl. No. 13/918,748 dated Jan. 2, 2015. 13 pages.
Non-Final Office Action in U.S. Appl. No. 13/928,300 dated Nov. 5, 2014. 11 pages.
Non-Final Office Action in U.S. Appl. No. 13/692,622 dated Sep. 30, 2014. 5 pages.
Final Office Action dated Feb. 25, 2015 for U.S. Appl. No. 13/439,730, 16 Pgs.
IP Address, Merriam-Webster Dictionary, Apr. 23, 2009, 1 page.

* cited by examiner

NETWORK PACKET 300

| HEADER FIELDS 310 | UDP SRC PORT: 8211 UDP DEST PORT: 8211 320 | MPP SRC PORT: 8224 MPP DEST PORT: 8222 330 | MESSAGE PAYLOAD ... 340 |

FIG. 3A

TRANSLATED NETWORK PACKET 350

| HEADER FIELDS 360 | UDP SRC PORT: 8211 UDP DEST PORT: 8222 370 | MPP SRC PORT: 8224 MPP DEST PORT: 8222 380 | MESSAGE PAYLOAD ... 390 |

FIG. 3B

SYSTEM AND METHOD FOR MESSAGE HANDLING IN A NETWORK DEVICE

RELATED APPLICATIONS

This application claims the benefit of priority on U.S. Provisional Patent Application 61/732,829, filed Dec. 3, 2012, the entire contents of which are incorporated by reference.

Related patent applications to the subject application include the following: (1) U.S. Patent Application entitled System and Method for Achieving Enhanced Performance with Multiple Networking Central Processing Unit (CPU) Cores by Janakiraman, et al., U.S. application Ser. No. 13/692,622, filed Dec. 3, 2012; (2) U.S. Patent Application entitled Ingress Traffic Classification and Prioritization with Dynamic Load Balancing by Janakiraman, et al., U.S. application Ser. No. 13/692,608, filed Dec. 3, 2012; (3) U.S. Patent Application entitled Method and System for Maintaining Derived Data Sets by Gopalasetty, et al., U.S. application Ser. No. 13/692,920, filed Dec. 3, 2012; (4) U.S. Patent Application entitled Session-Based Forwarding by Janakiraman, et al., U.S. application Ser. No. 13/918,748, filed Jun. 14, 2013; (5) U.S. Patent Application entitled Rate Limiting Mechanism Based on Device Load/Capacity or Traffic Content by Nambiar, et al., U.S. application Ser. No. 13/918,760, filed Jun. 14, 2013; (6) U.S. Patent Application entitled Control Plane Protection for Various Tables Using Storm Prevention Entries by Janakiraman, et al., U.S. application Ser. No. 13/918,770, filed Jun. 14, 2013.

FIELD

The present disclosure relates to networking processing performance. In particular, the present disclosure relates to a system and method for achieving enhanced performance for application message handling in a network device.

BACKGROUND

Network devices, such as network controllers, access points, network servers, etc. exchange network packets. The network packets may be generated by applications run on a network device, and communicated to another network device for the purpose of processing of those network packages. For example, an application run by an access point may generate network packets that include application specific data. The access point then transmits the network packets to a network controller to enable an application run by the network controller to process the application specific data. Such applications may include security applications, network performance applications, data routing applications, etc.

Because there are typically numerous network packets being transferred between network devices over a computing network simultaneously, the efficient handling of those network packets becomes increasingly important in order to avoid data bottlenecks at the destination network devices, as well as to enable the timely processing and exchange of application-specific data between applications on different network devices.

BRIEF DESCRIPTION OF THE DRAWINGS

The present disclosure may be best understood by referring to the following description and accompanying drawings that are used to illustrate embodiments of the present disclosure.

FIG. 3A is a diagram illustrating an exemplary application message network packet according to embodiments of the present disclosure.

FIG. 3B is a diagram illustrating an exemplary translated application message network packet according to embodiments of the present disclosure.

DETAILED DESCRIPTION

Figure 1:
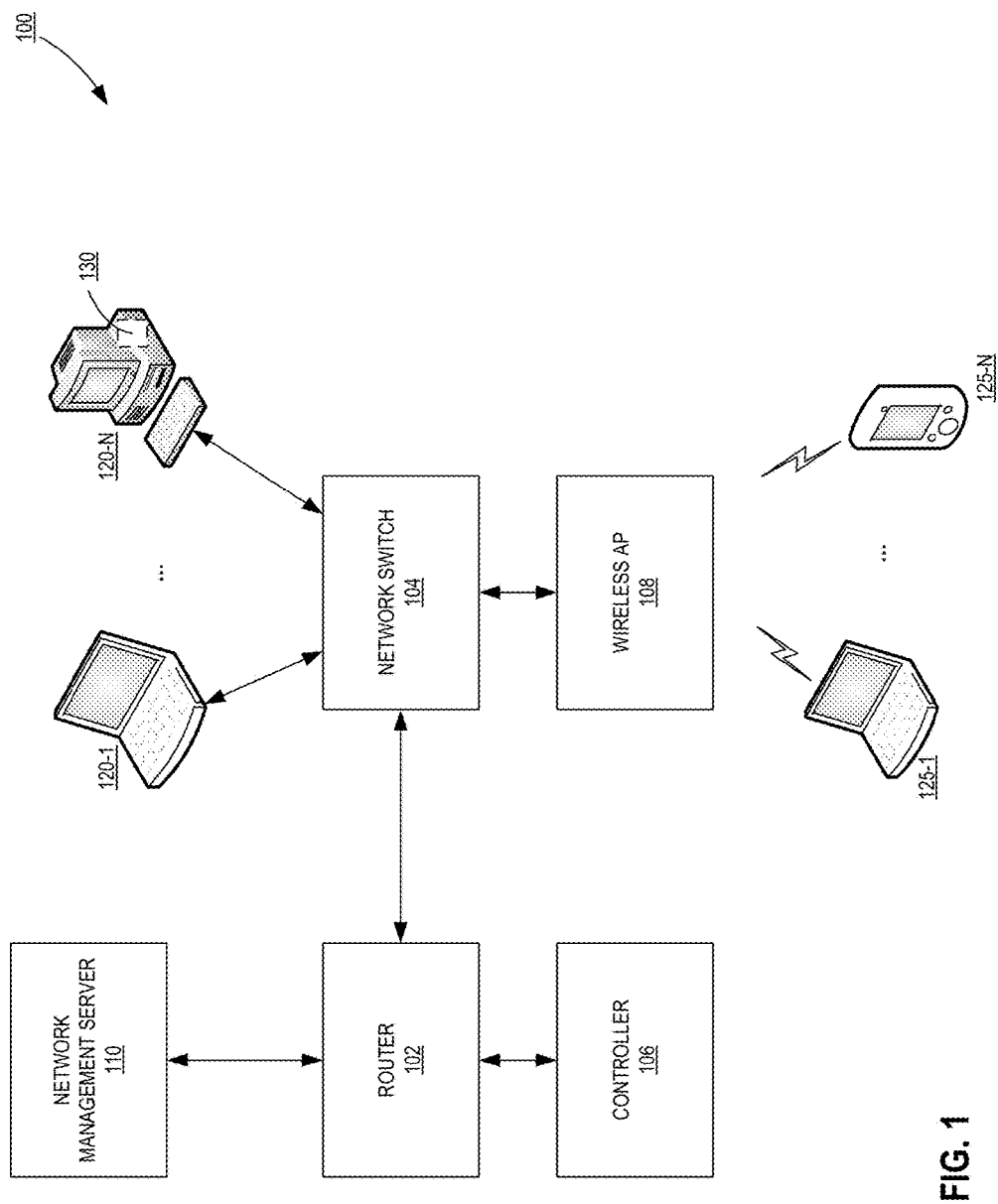
FIG. 1 is a block diagram of exemplary system architecture of a computing network.

In the following description, several specific details are presented to provide a thorough understanding. While the context of the disclosure is directed to performance enhancements for message handling in a network device, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Embodiments of the present disclosure relate to enhancing message handling performance in a network device. In particular, the present disclosure relates to a system and method for achieving enhanced message handling performance by translation of one or more addressing fields of an application network data packet in a first processing layer of the network device prior to forwarding of the application network packet to a second processing layer of the network device. The first processing layer may be a datapath, a networking operating system, or a secondary operating system executing on the device, and the second processing layer may be a control plane, a UNIX™ based operating system such as LINUX™, a real-time operating system, or a primary operating system executing on the device. In the embodiments discussed herein, the network device may be a network controller that receives a message (e.g., the network data packet), the first processing layer may be the datapath, and the second processing layer may be a control plane. However, the techniques discussed herein need not be limited to a network controller executing a datapath processing layer and a control plane processing layer, as any network device, such as an access point, a network switch, a network router, a network server, a network controller, etc. may employ any combination of processing layers in accordance with the discussion herein. However, in order to avoid obscuring the invention, the remaining description will describe, but should not be limited to, a network controller with a datapath processing layer and a control plane processing layer.

Applications run on different network devices communicate with one another via the exchange of messages, such as network routable data packets addressed to devices and/or applications executing on destination devices. As discussed herein, references to messages, data packets, and network packets are interchangeable. For example, an application run by an access point may generate application data. The application provides the application data to a message handler at the access point, which encapsulates the application data in a network packet suitable for transmission over a computing network. In one embodiment, the network packet is a user datagram protocol (UDP) network packet that is divided into a plurality of different fields. The different fields include an Ethernet header field, an internet protocol (IP) address header field, a UDP header field, a message passing protocol header field, and a message payload. The message handler at the access point then transmits the message over the computing network to a destination device, such as a network controller.

Network controllers receive the messages including the network packets in a datapath of the network controller, and then provide the network packets to a control plane of the network controller. A message handler operating in the control plane of the network controller receives the network packet on a UDP socket, and then delivers the network packet by reading the network packet, writing data to the network packet to enable a recipient application identify the data packet, and forwarding the network packet to the destination application on an operating system socket (e.g., a UNIX kernel socket). Then, the application on the network controller reads the network packet from the operating system socket and processes the application-specific data in the network packet.

In one embodiment, the approach of utilizing a message handler in the control plane of a network device, such as a network controller, is removed. In one embodiment, as discussed in greater detail below, processes running in the datapath (i.e., first processing layer) of the network controller translate one or more addressing fields of the network packet. After translating the network packet addressing fields in the datapath, a destination application operating in the control plane (i.e., second processing layer) monitors network packets on an operating system socket for packets addressed to the specific recipient application. When a network packet addressed to the application is detected by the application, the network packet may then simply be read and processed by the application. As a result, the consumption of processing resources consumed by the reading and writing of data to the network packets by a message handler in the control plane are avoided, which frees computing resources in the control plane for other purposes. Furthermore, bottlenecks caused by network packets being funneled into a message handler in the control plane are also avoided.

FIG. 1 is a block diagram of exemplary system architecture of a computing network 100 in which the embodiment discussed herein may be deployed. System architecture illustrates a network 100 that includes a plurality of network devices, such as controller 106, router 102, network switch 104, wireless access point (AP) 108, and network management server 110. Although only a single controller, router, network switch, wireless AP, and network management server are illustrated, the network 100 illustrated by system architecture may include one or more of each of the different network devices consistent with the discussion herein. In one embodiment, the controller 106 supports devices such as router 102, network switch 104, wireless AP 108 to enable communication channels within the network 100 that allow sharing of resources and information. In one embodiment, controller 106 provides networking across wireless and wired network connections, VPN connections, and remote services, and integrates networking and security functions into the network infrastructure and user experience.

The network 100, as referred to and discussed herein, may run on one Local Area Network (LAN) and may be incorporated into the same physical or logical system, or different physical or logical systems. Alternatively, network 100 may reside on different LANs, wide area networks, etc. that may be coupled together via the Internet but separated by firewalls, routers, and/or other network devices. It should be noted that various other network configurations can be used including, for example, hosted configurations, distributed configurations, centralized configurations, etc.

The system architecture further includes one or more client computing devices 120-1 through 120-N coupled to the network 100 via network switch 104, and one or more client computing devices 125-1 through 125-N coupled to the network 100 via wireless AP 108. Client computing devices 120 connect to the network switch 104, and client computing devices 125 connect to the wireless AP 108, to access services such as the Internet through controller 106.

The system architecture further includes one or more network management servers, such as network management server 110, coupled to the network 100. In one embodiment, network management server 110 executes network management applications. For example, network management server 110 may provide manual or automated network management services to manage various aspects affecting the network, such as managing the radio frequency environment, controllers, wired infrastructure, and access points. Network management server 110 may further provide a user interface to network administrators to provide charts, tables, diagnostic information and alerts.

In one embodiment, controller 106, router 102, network switch 104, wireless AP 108, and network management server 110 are purpose-made digital devices, each containing a processor, memory hierarchy, and input-output interfaces. In one embodiment of the invention, a MIPS-class processor such as those from Cavium or RMI is used. Other suitable processors, such as those from Intel or AMD may also be used. The memory hierarchy traditionally comprises fast read/write memory for holding processor data and instructions while operating, and nonvolatile memory such as EEPROM and/or Flash for storing files and system startup information. Wired interfaces are typically IEEE 802.3 Ethernet interfaces, used for wired connections to other network devices such as switches, or to a controller. Wireless interfaces may be WiMAX, 3G, 4G, and/or IEEE 802.11 wireless interfaces. In one embodiment of the invention, controllers, switches, and wireless APs operate under control of a LINUX® operating system, with purpose-built programs providing controller and access point functionality.

Client computing devices 120 and 125 also contain a processor, memory hierarchy, and a number of interfaces including a wired and/or wireless interfaces for communicating with network switch 104 or wireless AP 108. Typical client computing devices include personal computers, handheld and tablet computers, Wi-Fi phones, wireless barcode scanners, and the like.

Figure 2:
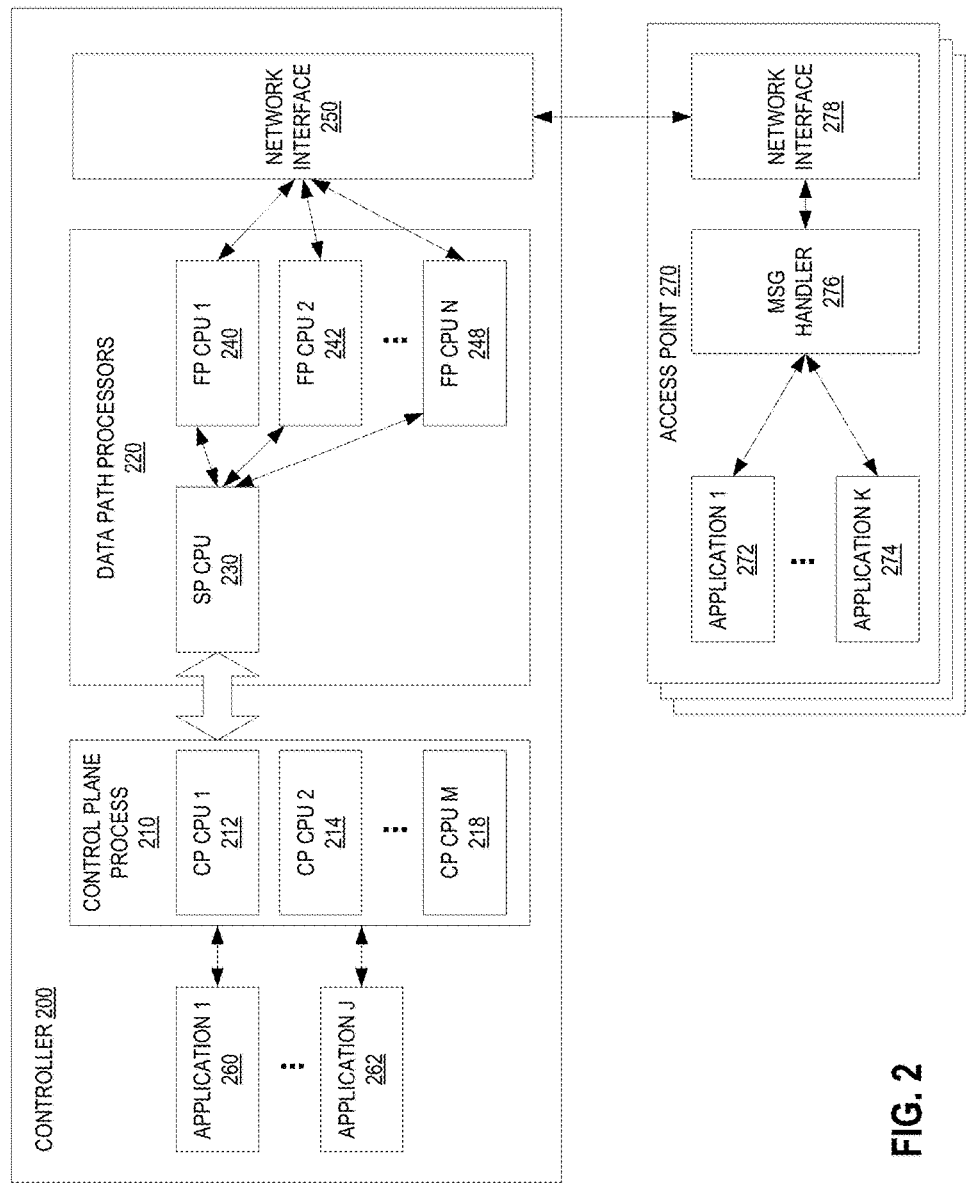
FIG. 2 illustrates exemplary architecture at multiple processing planes according to embodiments of the present disclosure.

FIG. 2 illustrates a general architecture of a network device, such as controller 106, which includes multiple processing planes according to embodiments of the present disclosure. Specifically, FIG. 2 illustrates a controller 200 that includes at least a control plane process 210, two or more datapath processors 220, a network interface 250, and one more applications, such as application 1 260 to application J 262. FIG. 2 further illustrates an access point 270 that includes at least a network interface 278, a message handler 276, and one or more applications, such as application 1 272 to application K 274. In one embodiment, the controller 200 and the access point 270 are communicatively coupled via a computing network (not shown). Furthermore, there may be more than one access point connected to controller 200, as well as other controllers connected to controller 200.

In controller 200, control plane process 210 may be running on one or more CPUs or CPU cores, such as CP CPU 1 212, CP CPU 2 214, . . . CP CPU M 218. Furthermore, control plane process 210 typically handles applications that perform network control or management of traffic generated by and/or terminated at network devices as opposed to data traffic generated and/or terminated at client devices. In one embodiment, the control plane process 210 executes application 1 260 to application J 262.

According to embodiments of the present disclosure, datapath processors 220 include a single slowpath (SP) processor (e.g., SP CPU 230) and multiple fastpath (FP) processors (e.g., FP CPU 1 240, FP CPU 2 242, . . . FP CPU N 248). Only FP processors are able to receive data packets directly from network interface 250. SP processor, on the other hand, only receives data packets from FP processors. Also, control plane process 210 is communicatively coupled to slowpath (SP) CPU 230, but not fastpath (FP) processors (e.g., FP CPU 1 240, FP CPU 2 242, . . . FP CPU N 248). Thus, whenever control plane process 210 needs information from datapath processors 220, control plane process 210 will communicate with SP processor (e.g., SP CPU 230).

In one embodiment, an application executed at access point 270 is in communication with an application executed at controller 200. The communication is in the form of the exchange of network packets that contain application-specific data generated by corresponding applications. For example, application K 274 of access point 270 may generate data for receipt by application J 262 of controller 200. Application K 274 provides the application-specific data to message handler 276 which encapsulates the data in a network packet suitable for transmission to controller 200.

FIG. 3A illustrates one embodiment of a network packet 300. The network packet is generated by an application and includes at least header fields 310, UDP addressing data field 320, a message passing protocol addressing data field 330, and a message payload 340. The header fields 310 contain standard fields, such as fields for an Ethernet header, an IP header, as well as other standard messaging fields (not illustrated). The UDP addressing data field 320 contains UDP source and UDP destination port addresses that enable the network packet 300 to be routed between appropriate devices as specified by the UDP source port and the UDP destination port addresses. The message passing protocol addressing data field 330 contains a message passing protocol source port addresses and a message passing protocol destination port address to enable the message payload within the network packet 300 to be provided to the intended destination application. In the illustration of FIG. 3A, the controller 200 addressing is specified as port 8211, the application of access point 270 is identified by source port 8224, and the destination application of controller 200 is identified by destination port 8222. The port addresses are illustrative, as other port addresses could be utilized. In one embodiment, a data packet as illustrated in FIG. 3A is transmitted from network interface 278 of access point 270 over a computing network to network interface 250 of controller 200.

In one embodiment, the received network packet is processed by at least one of FP processors. In one embodiment, the FP processors perform a process, which is discussed in greater detail below in FIG. 4, to translate addressing fields of the received network packet. In one embodiment, the message passing protocol port address in field 380, which identifies the port of the intended recipient application, replaces the UDP destination port address in field 370. The remaining header fields 360 and message payload 390, remain unchanged, except for the updated computation of a message checksum, which may be contained in the UDP addressing field 370.

As illustrated by the network packet of FIG. 3B, the UDP destination port address 370 is updated to port 8222. In one embodiment, the translated network packet, as illustrated in FIG. 3B, is provided to a kernel (not shown) that bridges the datapath processors 220 and the control plane process 210. The applications (e.g., application 1 260 to application J 262) listen to the kernel for network packets with corresponding port addresses in the UDP destination port address. When an application detects a network packet with the appropriate addressing data, the application reads the network packet and consumes the application-specific data in message payload 390.

Because the applications of controller 200 listen for their corresponding port addresses, a message handler application need not be run in the control plane for managing the routing of network packets to appropriate applications. As a result, processing resources are freed on the control plane for applications 260 through 262, as well as other processes on the control plane. Furthermore, when an application on controller 200 transmits application data to an application on access point 270, the FP processors in the datapath 220 perform a complementary network packet translation process that changes the source UDP port address to the destination UDP port address. In one embodiment, the source UDP port address is translated to the destination UDP port address so that both the source and destination UDP ports are addressed to the destination device message handler port, such as port 8211.

Figure 4:
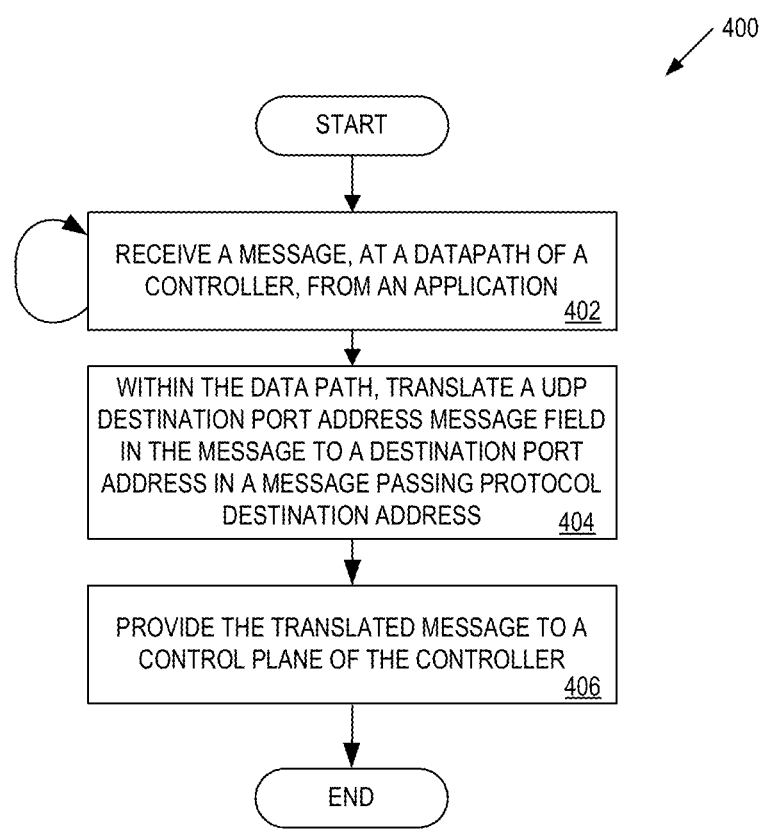
FIG. 4 is a flow diagram of a method for translating a network packet according to embodiments of the present disclosure.

FIG. 4 is a flow diagram of a method for translating a network packet according to embodiments of the present disclosure. The method 400 is performed by processing logic that may comprise hardware (circuitry, dedicated logic, etc.), software (such as is run on a general purpose computer system, networking device, or other dedicated machine), firmware, or a combination. In one embodiment, the method 400 is performed by one or more datapath processors 220 of a network controller 200. However, other network devices may perform the network packet translation in accordance with the techniques described herein.

In one embodiment, the process begins when a FP processor in a datapath of a network controller receives a message from an application (processing block 402). In one embodiment, the message is a UDP network packet. In one embodiment, processing logic receives the UDP network packet on a UDP socket, such as port 8211 or port 8209. The application may be an application on a different network device, such as an access point, network server, bridge, router, etc. which has communicated the network packet to the network controller. As discussed above, the network packet may encapsulate application-specific data within the UDP network packet to be processes by a recipient application.

Processing logic translates the UDP destination port address field in the message to a destination port address located in a message passing protocol destination address field of the network packet (processing block 404). In one embodiment, processing logic utilizes the destination application port address to overwrite the UDP port address field value in a network packet.

Processing logic then provides the translated message to a control plane of the network controller (processing block 406). In one embodiment, processing logic forwards a translated network packet to an operating system socket specified by the message passing protocol destination address field. By providing the network packet to the socket, the recipient application can detect when a network packet is available by monitoring the UDP destination port addresses. The intended destination application of the controller may then consume the application-specific data in the payload of the network packet.

In one embodiment, the process performed at processing block 406 may also include encapsulating the network packet into a transmission control protocol (TCP) session within the dataplane. Furthermore, in one embodiment, processing logic can further convert the network packet to one or more UDP packets. In this embodiment, the message passing protocol header data (i.e., the destination port address) is encapsulated into a TCP session identifier that can be utilized for tunneling the network packet(s) to the intended recipient application. In this embodiment, the network packet(s) would be further modified by adding internet protocol (IP) header data to the network packet(s) for the corresponding TCP session. Because the datapath manages the TCP session creation and packet transfer, a recipient application monitors for the converted UDP packets.

Figure 5:
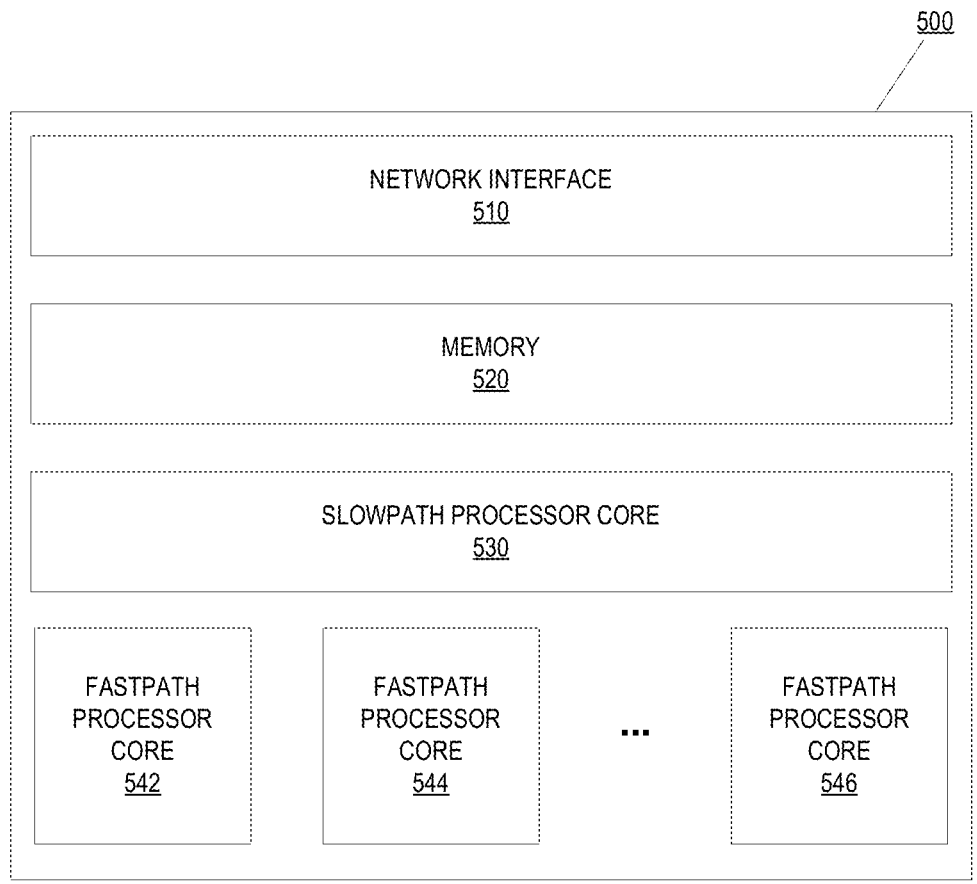
FIG. 5 is a block diagram illustrating a system of according to embodiments of the present disclosure.

FIG. 5 is a block diagram illustrating a network device according to embodiments of the present disclosure. Network device 500 includes at least a network interface 510 capable of communicating to a wired or wireless network, a memory 520 capable of storing data, a slowpath processor core 530 capable of processing network data packets, and one or more fastpath processor cores, including fastpath processor core 542, fastpath processor core 544, . . . , fastpath processor core 548, which are capable of processing network data packets. Moreover, network device 500 may be used as a network switch, network router, network controller, network server, etc. Further network device 500 may serve as a node in a distributed or a cloud computing environment.

Network interface 510 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, network interface 510 may be software-defined and programmable, for example, via an Application Programming Interface (API), and thus allowing for remote control of the network device 600.

Memory 520 can include storage components, such as, Dynamic Random Access Memory (DRAM), Static Random Access Memory (SRAM), etc. In some embodiments, memory 520 is a flat structure that is shared by all datapath processors (including, e.g., slow path processor core 530, fastpath processor core 542, fastpath processor core 544, . . . , fastpath processor core 548, etc.), and not tied to any particular CPU or CPU cores. Any datapath processor can read any memory location within memory 520. Memory 520 can be used to store various tables to assist software network packet forwarding. For example, the tables may include, but are not limited to, a bridge table, a session table, a user table, a station table, a tunnel table, a route table and/or route cache, etc.

Slowpath processor core 530 typically includes a networking processor core that is capable of processing network data traffic. Slowpath processor core 530 is a single dedicated CPU core that typically handles table managements. Note that, slowpath processor core 530 only receives data packets from one or more fastpath processor cores, such as fastpath processor core 542, fastpath processor core 544, . . . , fastpath processor core 548. In other words, slowpath processor core 530 does not receive data packets directly from any line cards or network interfaces.

Fastpath processor cores 542-548 also include networking processor cores that are capable of processing network data traffic. However, by definition, fastpath processor cores 542-548 only performs "fast" packet processing. Thus, fastpath processor cores 542-549 do not block themselves and wait for other components or modules during the processing of network packets. Any packets requiring special handling or wait by a processor core will be handed over by fastpath processor cores 542-548 to slowpath processor core 530.

According to embodiments of the present disclosure, network services provided by network device 500, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point, a network controller, etc. with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium storing executable instructions that when executed by a processor of a first device cause the processor to:
   receive, at a first processing layer implemented by the first device, a first message addressed, from a second device, to a first port, wherein the first message includes a first field including a destination port;
   modify, by the first processing layer, the first message prior to forwarding the first message to a second processing layer implemented by the first device, wherein the destination port of the first field is replaced with an address of a second port taken from a second field of the first message such that the first message is addressed to the second port;
   forward, by the first processing layer to the second processing layer, the first message including the modified destination port of the first field addressed to the second port, wherein an application polls the first message upon detecting that the first message includes the destination port with the address of the second port and the second processing layer does not read the first message received from the first processing layer;
   receive, at the first processing layer implemented by the first device from the second processing layer implemented by the first device, a second message indicating a third port as a source port;
   modify the source port indicated in the second message to a fourth port, wherein to modify the source port indicated in the second message to the fourth port, the processor is to overwrite and replace the address of the third port, and wherein the address of the fourth port is the address of message handler port of the second device; and
   forward, by the first processing layer, the modified second message to the second device including the modified source port.

2. The non-transitory computer-readable medium of claim 1, wherein the first processing layer is a first operating system executing on the first device and the second processing layer is a second operating system executing on the first device.

3. The non-transitory computer-readable medium of claim 1, wherein the first processing layer is a datapath implemented on the first device and the second processing layer is a control plane implemented on the first device.

4. The non-transitory computer-readable medium of claim 1, further comprising instructions to modify the message prior to the packet reaching a transmission control protocol/internet protocol (TCP/IP) stack implemented by the first device.

5. The non-transitory computer-readable medium of claim 1, wherein the instructions to modify the message-include instructions to modify a user datagram protocol (UDP) header in the message.

6. The non-transitory computer-readable medium of claim 1, further comprising instructions to receive, by a first user application, the modified message, wherein the first user application is associated with the second port.

7. The non-transitory computer-readable medium of claim 1, wherein instructions to modify the message include instructions to convert the message to a UDP packet.

8. A first device comprising:
   a hardware processor; and
   a processor-readable memory on which is stored instructions that are to cause the hardware processor to:

receive, at a first processing layer implemented by the first device, a first message addressed, from a second device, to a first port, wherein the first message includes a first field including a destination port, modify, by the first processing layer, the first message to be addressed to a second port of a second device prior to forwarding the first message to a second processing layer implemented by the first device, wherein the destination port of the first field is replaced with an address of a second port taken from a second field of the first message such that the first message is addressed to the second port; and forward, by the first processing layer to the second processing layer, the modified message of the first field addressed to the second port of the second device, wherein an application polls the first message upon detecting that the first message includes the destination port with the address of the second port and a message handler of the second processing layer does not read the first message addressed to the first port;

receive, at the first processing layer implemented by the first device from the second processing layer implemented by the first device, a second message indicating a third port as a source port;

modify the source port indicated in the second message to a fourth port, wherein to modify the source port indicated in the second message to the fourth port, the processor is to overwrite and replace the address of the third port, and wherein the address of the fourth port is the address of message handler port of the second device; and forward, by the first processing layer, the modified second message to the second device including the modified source port.

9. The first device of claim 8, wherein the first processing layer is a first operating system executing on the first device and the second processing layer is a second operating system executing on the first device.

10. The first device of claim 8, wherein the first processing layer is a datapath implemented on the first device and the second processing layer is a control plane implemented on the first device.

11. The device of claim 8, wherein the instructions are further to cause the hardware processor to modify the message prior to the packet reaching a transmission control protocol/internet protocol (TCP/IP) stack implemented by the first device.

12. The first device of claim 8, wherein to modify the message, the instructions are further to cause the hardware processor to modify a user datagram protocol (UDP) header in the message.

13. The first device of claim 8, wherein the first application that receives the message is an application in a user space and the first application is associated with the second port.

14. The first device of claim 8, wherein to modify the message, the instructions are further to cause the hardware processor to convert the message to a UDP packet.

15. An article of manufacture having non-transitory computer readable storage media storing executable instructions thereon which when executed by a processor of a first-devices cause the processor to:

receive, at a first processing layer implemented by the first device, a first message addressed, from a second device, to a first port, wherein the first message includes a first field including a destination port;

modify, by the first processing layer, the first message prior to forwarding the first message to a second processing layer implemented by the first device, wherein the destination port of the first field is replaced with an address of a second port taken from a second field of the first message such that the first message is addressed to the second port;

forward, by the first processing layer to the second processing layer, the first message including the modified destination port of the first field addressed to the second port, wherein an application polls the first message upon detecting that the first message includes the destination port with the address of the second port and the second processing layer does not read the first message received from the first processing layer;

receive, at the first processing layer implemented by the first device from the second processing layer implemented by the first device, a second message indicating a third port as a source port;

modify the source port indicated in the second message to a fourth port, wherein to modify the source port indicated in the second message to the fourth port, the processor is to overwrite and replace the address of the third port, and wherein the address of the fourth port is the address of message handler port of the second device; and forward, by the first processing layer, the modified second message to the second device including the modified source port.

16. The article of manufacture of claim 15, wherein the first processing layer is a datapath implemented on the first device and the second processing layer is a control plane implemented on the first device.

17. The article of manufacture of claim 15, wherein to modify the message, the executable instructions are further to cause the processor to: modify a user datagram protocol (UDP) header in the message.

* * * * *